United States Patent
Yanetta et al.

(10) Patent No.: US 12,366,275 B2
(45) Date of Patent: Jul. 22, 2025

(54) METHOD FOR FORMING A DOUBLE LAYER WET FRICTION MATERIAL WITH CELLULOSE LAYER

(71) Applicant: Schaeffler Technologies AG & Co. KG, Herzogenaurach (DE)

(72) Inventors: Michael Yanetta, Valley City, OH (US); Murat Bakan, Wooster, OH (US); Rashid Farahati, Copley, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 1145 days.

(21) Appl. No.: 16/862,474

(22) Filed: Apr. 29, 2020

(65) Prior Publication Data
US 2021/0341026 A1 Nov. 4, 2021

(51) Int. Cl.
| F16D 69/02 | (2006.01) |
| F16D 13/64 | (2006.01) |
| F16D 13/72 | (2006.01) |
| F16D 13/74 | (2006.01) |
| F16D 69/00 | (2006.01) |
| F16H 45/02 | (2006.01) |

(52) U.S. Cl.
CPC .......... *F16D 69/026* (2013.01); *F16D 13/64* (2013.01); *F16D 13/72* (2013.01); *F16D 13/74* (2013.01); *F16D 2069/008* (2013.01); *F16D 2200/0078* (2013.01); *F16D 2200/0091* (2013.01); *F16H 45/02* (2013.01); *F16H 2045/0273* (2013.01)

(58) Field of Classification Search
CPC ..... F16D 69/02–026; F16D 2200/0091; F16D 2069/008; F16D 2200/0078; F16D 2200/006; F16D 13/64; F16D 13/72; F16D 13/74; F16H 2045/0273; F16H 2045/0294; F16H 45/02
USPC .................................................. 442/148, 101
See application file for complete search history.

(56) References Cited

U.S. PATENT DOCUMENTS

| 4,256,801 A | 3/1981 | Chuluda |
| 4,775,705 A | 10/1988 | Parker et al. |
| 5,576,358 A | 11/1996 | Lem et al. |
| 5,585,166 A | 12/1996 | Kearsey |
| 5,775,468 A * | 7/1998 | Lam ...................... F16D 69/026 442/101 |
| 2004/0146702 A1 | 7/2004 | Shao et al. |

(Continued)

FOREIGN PATENT DOCUMENTS

| CN | 1176685 A | 3/1998 |
| CN | 1539064 A | 10/2004 |

(Continued)

OTHER PUBLICATIONS

Search Report for PCT/US2021/027906.

*Primary Examiner* — Lynda Salvatore
(74) *Attorney, Agent, or Firm* — Davidson Kappel LLC

(57) ABSTRACT

A method of making a wet friction material includes coating a first outer surface of a cellulose layer with a friction coating; placing a matrix of fibers and filler particles on a second outer surface of the cellulose layer; and saturating the matrix of fibers and filler particles with a binder and curing the binder to join the matrix of fibers and filler particles together to form a wet friction material base layer and to join wet friction material base layer to the second outer surface of the cellulose layer.

13 Claims, 3 Drawing Sheets

(56) References Cited

U.S. PATENT DOCUMENTS

| | | |
|---|---|---|
| 2004/0198866 A1 | 10/2004 | Sasaki et al. |
| 2005/0064778 A1 | 3/2005 | Lam et al. |
| 2016/0208153 A1 | 7/2016 | Hede et al. |
| 2017/0261057 A1* | 9/2017 | Farahati ................. F16H 45/02 |
| 2019/0003544 A1 | 1/2019 | Dong et al. |
| 2019/0024744 A1 | 1/2019 | Baba et al. |
| 2019/0085909 A1 | 3/2019 | Kim et al. |
| 2019/0277345 A1 | 9/2019 | Murat et al. |
| 2019/0277359 A1 | 9/2019 | Farahati et al. |
| 2020/0048151 A1* | 2/2020 | Poteet ................. C04B 41/5035 |

FOREIGN PATENT DOCUMENTS

| | | |
|---|---|---|
| CN | 1624356 A | 6/2005 |
| CN | 103154559 A | 6/2013 |
| CN | 108350967 A | 7/2018 |
| CN | 108495905 A | 9/2018 |
| EP | 0854305 | 7/1998 |
| EP | 1750031 A2 | 2/2007 |
| JP | S5692983 A | 7/1981 |
| JP | S63152735 A | 6/1988 |
| JP | S63254240 A | 10/1988 |
| JP | S63309531 A | 12/1988 |
| JP | H04198227 A | 7/1992 |
| JP | 2004217790 A | 8/2004 |
| JP | 2004231965 A | 8/2004 |
| JP | 2014077039 A | 5/2014 |
| KR | 1020180025337 A | 3/2018 |
| WO | WO2006067184 A1 | 6/2006 |

\* cited by examiner

METHOD FOR FORMING A DOUBLE LAYER WET FRICTION MATERIAL WITH CELLULOSE LAYER The present disclosure relates generally to friction clutches and plates used in torque converters and motor vehicle transmissions and more specifically to wet friction material.

BACKGROUND

The friction material in wet-type friction clutches generally operates in an oil submerged environment and is often paper-based material used to form friction material rings. It is known to form the friction material by a paper making process using a Fourdrinier machine. Double layer wet friction materials are known.

SUMMARY OF THE INVENTION

A method of making a wet friction material is provided. The method includes coating a first outer surface of a cellulose layer with a friction coating; placing a matrix of fibers and filler particles on a second outer surface of the cellulose layer; and saturating the matrix of fibers and filler particles with a binder and curing the binder to join the matrix of fibers and filler particles together to form a wet friction material base layer and to join wet friction material base layer to the second outer surface of the cellulose layer.

In some embodiments of the method, the coating of the first outer surface of the cellulose layer with the friction coating may include applying a friction solution including water, a solution binder and filler particles to the first outer surface, and drying the friction solution to form the friction coating. The friction solution may include 1 to 10% by weight of solution binder, 5 to 60% by weight of filler particles and 30 to 94% by weight of water. The coating of the first outer surface of the cellulose layer with the friction coating may include spraying, brushing or rolling the friction solution onto the outer surface of the cellulose layer. The friction coating may include a solution binder and filler particles. The friction coating may include 10 to 30% by weight of solution binder and 70 to 90% by weight of filler particles. The friction coating may include 12.5 to 25% by weight of solution binder and 75 to 87.5% by weight of filler particles. The solution binder may be a nano-cellulose, guar gum or a quaternary ammonium salt. The placing of the matrix of fibers and filler particles on the second outer surface of the cellulose layer may include draining liquid in the matrix through a porous support surface on which the friction coating rests. The method may further include compressing the matrix while on the second outer surface of the cellulose layer.

A method of making a part of a friction clutch is also provided comprising making the wet friction material; and fixing the wet friction material to a metal part of the friction clutch such that the wet friction material base contacts the metal part and the friction coating faces away from the metal part.

A wet friction material is also provided that includes a wet friction material base layer including a matrix of fibers and filler particles and a base binder embedded in the wet friction material base layer; a cellulose layer including a first outer surface fixed to the wet friction material base layer; and a friction coating fixed to a second outer surface of the cellulose layer.

In some embodiments of the wet friction material, the friction coating may include a solution binder and filler particles. The friction coating may include 10 to 30% by weight of solution binder and 70 to 90% by weight of filler particles. The friction coating may include 12.5 to 25% by weight of solution binder and 75 to 87.5% by weight of filler particles. The fibers of the wet friction material base may be at least 70% by weight aramid fibers. The filler particles may be diatomaceous earth.

A clutch assembly is also provided including a metal part and the wet friction material fixed on the metal part such that the wet friction material base contacts the metal part and the friction coating faces away from the metal part.

BRIEF DESCRIPTION OF THE DRAWINGS

The present disclosure is described below by reference to the following drawings, in which.

DETAILED DESCRIPTION

The present disclosure provides a method of forming a wet friction material that includes applying a friction coating to cellulose layer, and bonding a friction material base to the coated cellulose layer. The cellulose layer increases the wet strength of the friction material base during production. The cellulose layer may be a scrim layer—i.e., a layer of material that is used for coffee filters and tea bags.

FIGS. 1a to 1d schematically illustrate a method of forming a wet friction material and a clutch assembly in accordance with an embodiment of the present disclosure.

Figure 1A:
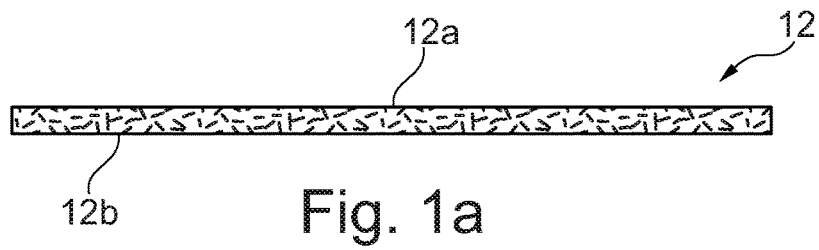
FIG. 1a schematically shows a cellulose layer according to an embodiment.

FIG. 1a shows a cellulose layer 12 including a planar upper outer surface 12a and a planar lower outer surface 12b. Cellulose layer 12 is formed of a thin layer of cellulose and has a sufficient porosity to drain liquid therethrough. Cellulose layer 12 may have a thickness of 100 to 200 microns, a density of 0.05 g/cm$^3$-0.25 g/cm$^3$ and/or a porosity of 35-65%.

Figure 1B:
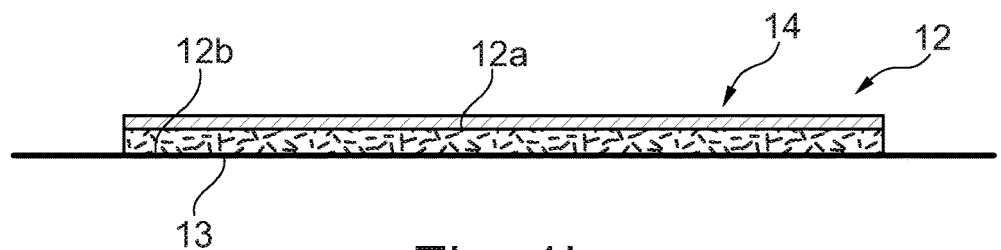
FIG. 1b schematically shows the cellulose layer coated with a friction coating.

FIG. 1b shows cellulose layer 12 being coated with a friction coating 14 on upper outer surface 12a. Cellulose layer 12 is placed onto a support surface 13 with outer surface 12a contacting support surface 13, which may be movable support surface such as a conveyer, and a friction solution is applied to cellulose layer 12 to form friction coating 14. Friction coating 14 may be applied by spraying, rolling or brushing onto outer surface 12a. The coated cellulose layer 12 maintains porosity, but the porosity is decreased after coating 14 is applied. For example, if measured by a Densometer from Gurley Precision Instruments, in particular a Model 4110N Genuine Gurley Densometer, which pushes a set volume of air through the material, the time is 4 to 9 seconds before the coating 14 is applied, whereas the time is 10 to 20 second after coating 14 is applied.

The friction solution may include filler particles and a binder. The binder in the solution is referred to herein as a solution binder to distinguish from the binder that is added to a frictional material base 16 described hereafter, which is referred to herein as a base binder. The solution binder may be a nano-cellulose, such as for example carboxy methyl cellulose sodium, guar gum or a quaternary ammonium salt (QAS). In one embodiment the QAS is quaternary ammonium salt that has alkyl chains with ~16 to 18 carbon atoms. For example, the QAS may be Arquad 2HT-75 which is a Di(hydrogenated tallowalkyl)dimethyl ammonium chloride. The filler particles may be diatomaceous earth. The friction solution may include 1 to 10% by weight of solution binder, 5 to 60% by weight of filler particles and 30 to 94% by weight of water. The amount of water used in the solution may depend on the method of application. For example, rolling or brushing may require approximately ⅙ to ¼ the amount of water as spraying. For rolling or brushing, the QAS containing solution may include 4 to 10% by weight of solution binder, 10 to 60% by weight of filler particles and 30 to 86% by weight of water. For spraying, the QAS containing solution may include 1 to 5% by weight of solution binder, 5 to 30% by weight of filler particles and 65 to 98% by weight of water.

After the QAS containing solution is applied to the cellulose layer 14, the water is removed by drying the friction solution to finalize the formation of friction coating 14. The drying may be performed by hot air blow drying or drying via heated plates. In either case, the paper surface reaches a temperature of 90 to 110° C. Friction coating 14, after drying, may include 10 to 30% by weight of solution binder and 70 to 90% by weight of filler particles. In some embodiments, friction coating 14, after drying, may include 12.5 to 25% by weight of solution binder and 75 to 87.5% by weight of filler particles.

Figure 1C:
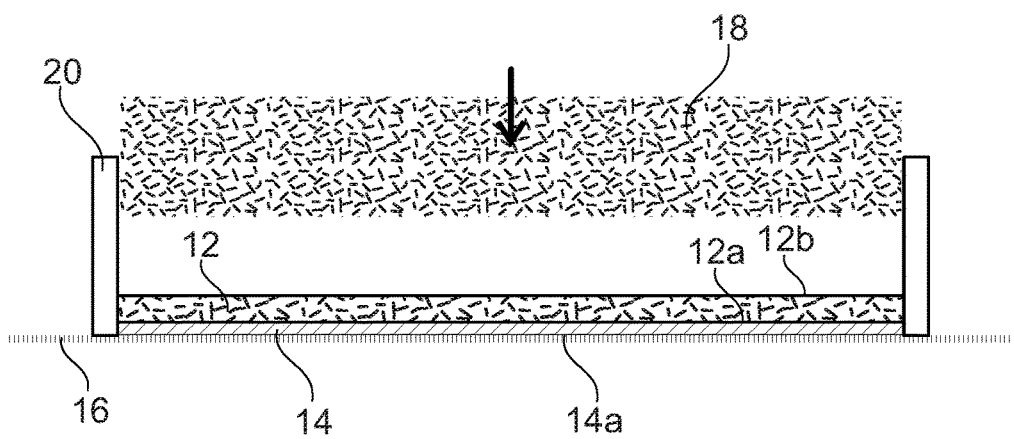
FIG. 1c shows a matrix of fibers and filler particles being placed on the cellulose layer.

As shown in FIG. 1c, after friction coating 14 is dried on cellulose layer 12, cellulose layer 12 is positioned on a porous support surface 16, for example a wire mesh, with an outer surface 14a of friction coating 14 facing downward and resting on porous support surface 16. Porous support surface 16 may be movable and may for example by a conveyor. A matrix 18 of fibers and filler materials, joined together in a solution, is then dumped on top of outer surface 12b of cellulose layer 12, and the liquid remaining in matrix 18 is drained through cellulose layer 12 and through porous support surface 16. A mold 20 for shaping matrix 18 into a friction material base 22 (FIG. 1d) is provided on top of porous support surface 16.

Figure 1D:
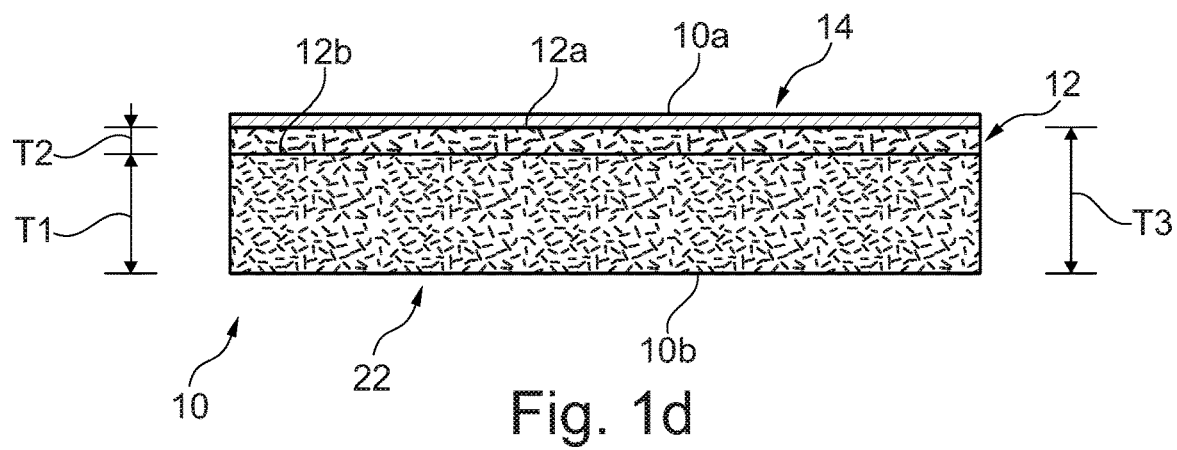
FIG. 1d shows a wet friction material including the friction coated cellulose layer and the matrix of fibers and filler particles formed into a base layer.

While matrix 18 is placed on top of cellulose layer 12, matrix 18 is then compressed, for example via rollers to reduce the thickness of matrix 18 and increase the density of matrix 18. After compression, matrix 18 is saturated with a base binder, which is then cured for example via pressing a heat plate onto matrix to join matrix 18 to cellulose layer 12 and to form a friction material base layer 22 fixed to cellulose layer 12 to form wet friction material 10 as shown in FIG. 1d, including a first planar outer surface 10a defined by friction coating 14 and a second planar outer surface 10b defined by friction material base layer 22. The curing of the phenolic resin solidifies and hardens wet friction material base layer 22 to fix the fibers and particles in place, which improves the strength of the wet friction material 10.

Wet friction material base layer 22 is thus formed of fibers, filler material and a base binder. The fibers can be aramid fibers, organic fibers, carbon fibers and/or fiberglass. The organic fibers may include cellulose fibers or cotton fibers. In one embodiment, at least 70% of the fibers are aramid fibers. In one embodiment, the fibers consist of only aramid fibers. The filler material may be particles of diatomaceous earth. The base binder may be a phenolic resin. Optionally a friction modifier such as graphite may also be included in base layer 22. The fibers of base layer 22 may have a mean diameter of 45 to 55 microns and a mean length of 1 to 2 millimeters.

In one preferred embodiment, base layer 22 may include, by percentage weight, 30 to 45% fibers, 25 to 35% filler material and 25 to 40% base binder. More specifically, wet friction material 12 may include, by percentage weight, 30 to 35% fibers, 30 to 35% filler material and 30 to 35% base binder.

As shown in FIG. 1d, wet friction material 10 is formed such that base friction material layer 22 has a thickness T1, cellulose layer 12 and friction coating 14 together have a thickness T2, and wet friction material 10 has a total thickness T3 between outer surface 10a and outer surface 10b. In one preferred embodiment, the thickness T2 of cellulose layer 12 and friction coating 14 is equal 5 to 10% of the total thickness T3, with thickness T1 of support layer 114 thus being 70 to 90% of the total thickness T3.

Figure 2:
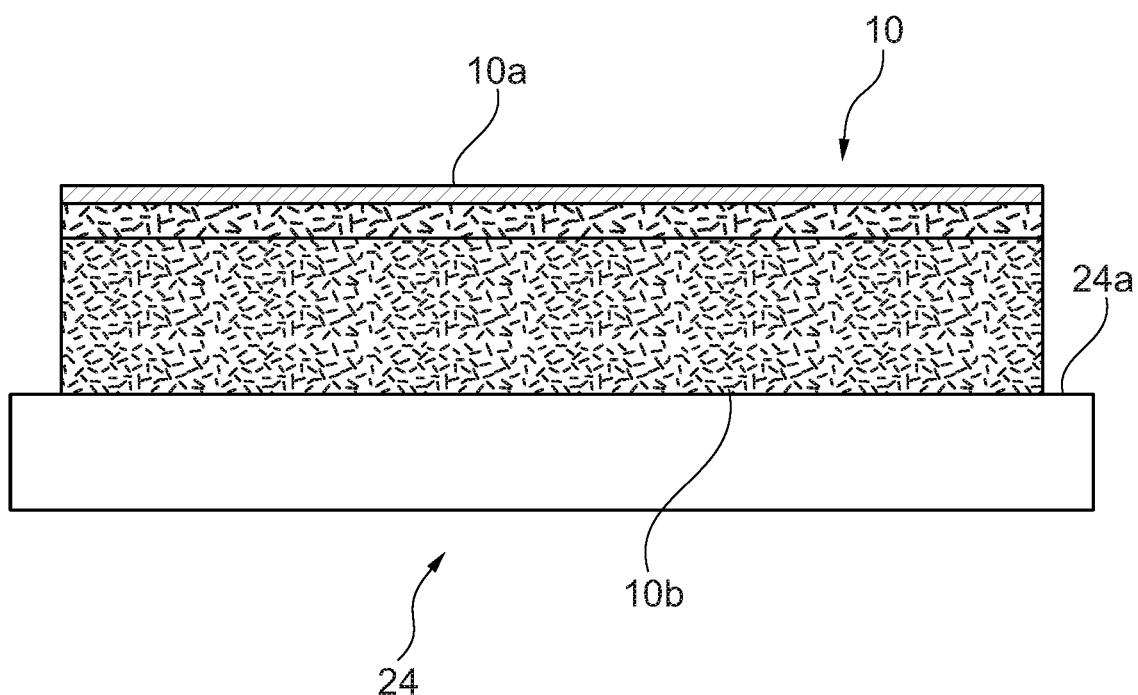
FIG. 2 shows the wet friction material being joined on top of a metal part via a heat plate.

As shown in FIG. 2, wet friction material 10 is then placed on top of a metal part 24 such that outer surface 10b of wet friction material 10 contacts a planar surface 24a of metal part 24, and wet friction material 10 and part 24 are joined together to form a friction assembly. An adhesive film applied between surfaces 10b and 24a creates a permanent connection between metal part 24 and wet friction material 10 due to time, temperature and pressure applied.

Figure 3:
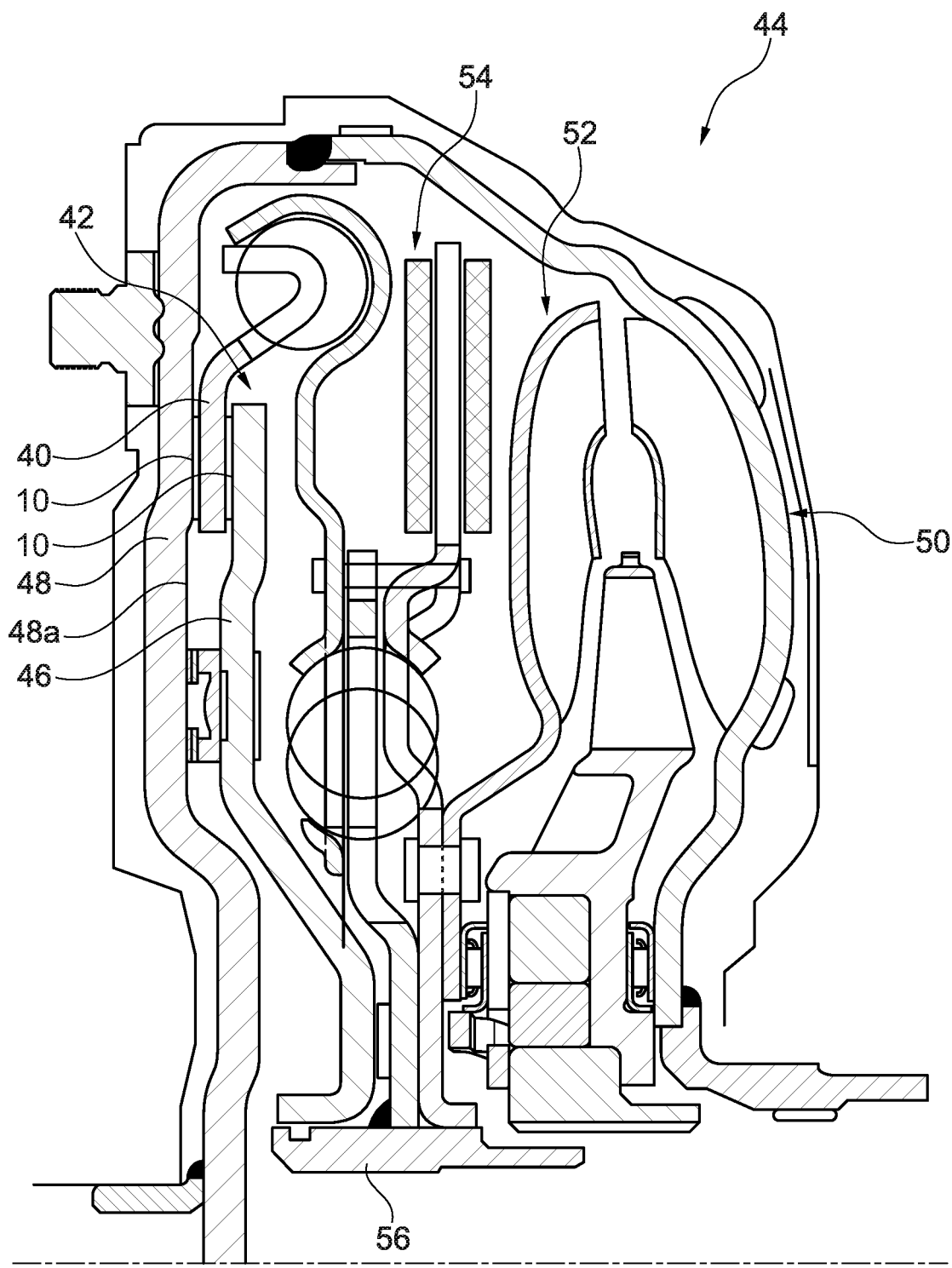
FIG. 3 shows a wet friction material bonded to both sides of a clutch plate of lockup clutch assembly of a torque converter.

FIG. 3 shows wet friction material 10 bonded to both sides of a metal part in the form of a clutch plate 40 of lockup clutch assembly 42 of a torque converter 44. A piston 46 of lockup clutch assembly 42 forces clutch plate 40 against an inside surface 48a of a front cover 48 of torque converter 44. Piston 46 contacts the surface 10a of the rear piece of wet friction material 42 to force the surface 12a on the front piece of wet friction material 10 against inside surface 48a of front cover 48. The forcing of clutch plate 40 against front cover 48 by piston 46 locks the lockup clutch assembly 42 such that a torque path in torque converter 44 to a transmission input shaft bypasses an impeller 50 and a turbine 52 of torque converter 44, and instead flows from front cover 48 to clutch plate 40 and through a damper assembly 54 to a transmission input shaft that is connected to an output hub 56 of torque converter 44.

In the preceding specification, the disclosure has been described with reference to specific exemplary embodiments and examples thereof. It will, however, be evident that various modifications and changes may be made thereto without departing from the broader spirit and scope of disclosure as set forth in the claims that follow. The specification and drawings are accordingly to be regarded in an illustrative manner rather than a restrictive sense.

LIST OF REFERENCE NUMERALS 10 wet friction material
10a first planar outer surface
10b second planar outer surface
12 cellulose layer
12a first planar outer surface
12b second planar outer surface
13 support surface 14 friction coating
16 porous support surface
18 matrix of fibers and filler particles
20 mold
22 wet friction material base
24 metal part
24a surface
40 clutch plate
42 lockup clutch assembly
42 lockup clutch assembly
44 torque converter
46 piston
48 front cover
48a inside surface
50 impeller
52 turbine
54 damper assembly
56 output hub
112 double layer wet friction material
113 base
114 support layer
114a upper outer surface
114b lower outer surface
116 outer layer
116a upper outer surface
116b lower outer surface
120 QAS containing layer
T1 support layer thickness
T2 outer layer thickness
T3 total thickness

What is claimed is:

1. A method of making a wet friction material comprising:
coating a first outer surface of a cellulose layer with a friction coating;
placing a matrix of fibers and filler particles on a second outer surface of the cellulose layer; and
saturating the matrix of fibers and filler particles with a binder and curing the binder to join the matrix of fibers and filler particles together to form a wet friction material base layer and to join wet friction material base layer to the second outer surface of the cellulose layer.

2. The method as recited in claim 1 wherein the coating of the first outer surface of the cellulose layer with the friction coating includes applying a friction solution including water, a solution binder and filler particles to the first outer surface, and drying the friction solution to form the friction coating.

3. The method as recited in claim 2 wherein the friction solution includes 1 to 10% by weight of solution binder, 5 to 60% by weight of filler particles and 30 to 94% by weight of water.

4. The method as recited in claim 2 wherein the coating of the first outer surface of the cellulose layer with the friction coating includes spraying, brushing or rolling the friction solution onto the outer surface of the cellulose layer.

5. The method as recited in claim 1 wherein the friction coating includes a solution binder and filler particles.

6. The method as recited in claim 5 wherein the friction coating includes 10 to 30% by weight of solution binder and 70 to 90% by weight of filler particles.

7. The method as recited in claim 6 wherein the friction coating includes 12.5 to 25% by weight of solution binder and 75 to 87.5% by weight of filler particles.

8. The method as recited in claim 5 wherein the solution binder is a nano-cellulose, guar gum or a quaternary ammonium salt.

9. The method as recited in claim 1 wherein the placing of the matrix of fibers and filler particles on the second outer surface of the cellulose layer includes draining liquid in the matrix through a porous support surface on which the friction coating rests.

10. The method as recited in claim 1 further comprising compressing the matrix while on the second outer surface of the cellulose layer.

11. A method of making a part of a friction clutch comprising:
making the wet friction material with the method as recited in claim 1,
fixing the wet friction material to a metal part of the friction clutch such that the wet friction material base contacts the metal part and the friction coating faces away from the metal part.

12. The method as recited in claim 1 wherein the cellulose layer is a scrim layer.

13. A method of making a wet friction material comprising:
coating a first outer surface of a cellulose layer with a friction coating;
placing a matrix of fibers and filler particles on a second outer surface of the cellulose layer; and
after the coating and placing steps, saturating the matrix of fibers and filler particles with a binder and curing the binder to join the matrix of fibers and filler particles together to form a wet friction material base layer and to join wet friction material base layer to the second outer surface of the cellulose layer.

\* \* \* \* \*